INVENTORS.
Grant W. Booth,
Stephen M. Fillebrown
& Linder C. Hobbs
BY Morris L. Rabkin
ATTORNEY.

MEMORY SYSTEM

INVENTORS.
Grant W. Booth,
Stephen M. Fillebrown
& Linder C. Hobbs
BY [signature]
ATTORNEY.

United States Patent Office 2,911,624

Patented Nov. 3, 1959

2,911,624

MEMORY SYSTEM

Grant W. Booth, Collingswood, and Linder C. Hobbs, Haddonfield, N.J., and Stephen M. Fillebrown, Waterford, Maine, assignors to Radio Corporation of America, a corporation of Delaware Application March 24, 1955, Serial No. 496,486

7 Claims. (Cl. 340—174)

Figure 1:
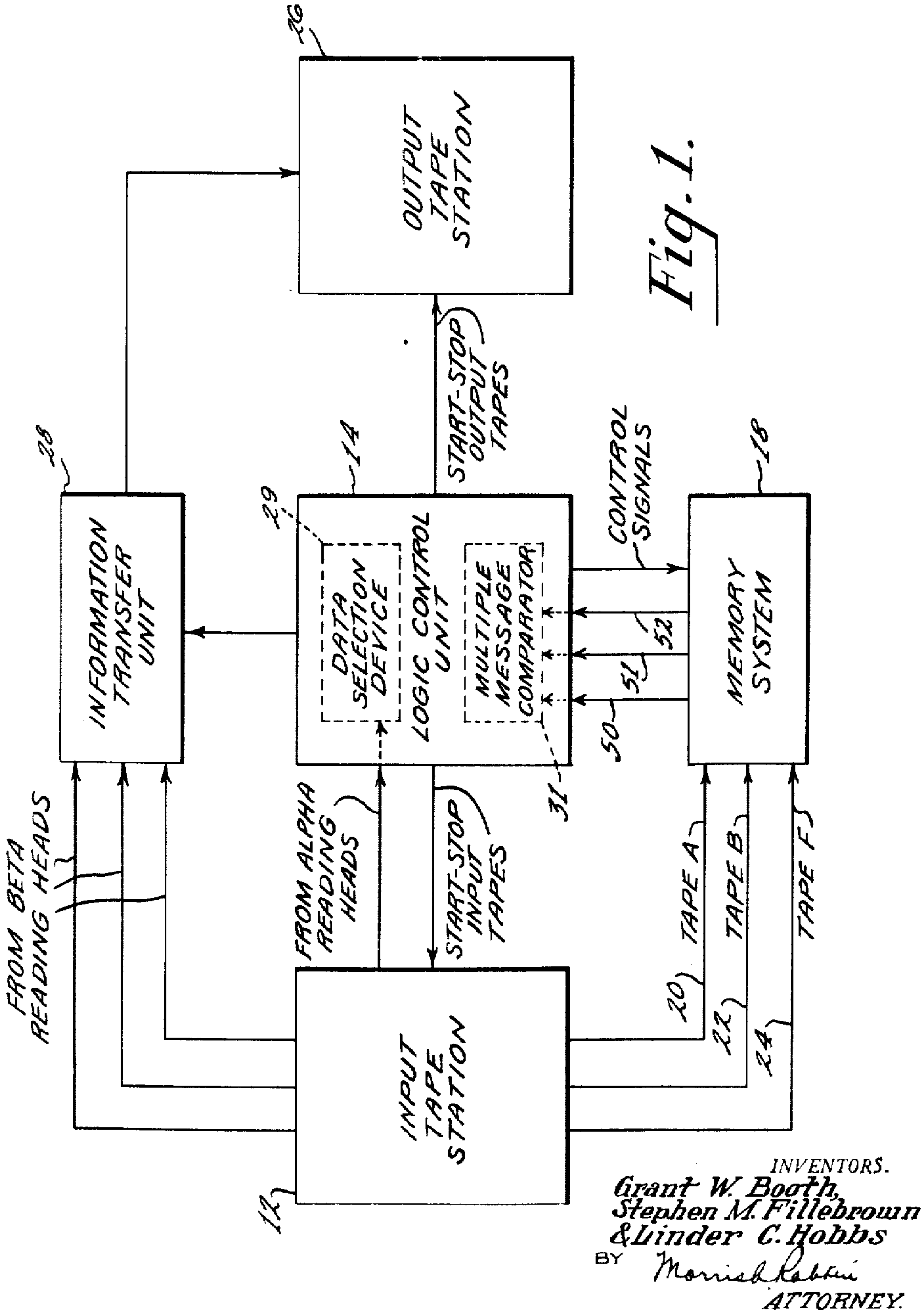

This invention relates to information handling machines, and particularly to an improved memory system useful in such machines.

Information handling machines are employed in applications where large volumes of information are handled and analyzed. Relatively inexpensive storage media such as magnetic and paper tape are often used. Because serial access to the stored information is relatively slow, the incoming information may be sorted into some logical order before it is supplied to a high-speed computer. Ordered information on two or more tapes may be merged onto another tape.

In applications such as inventory-control, periodic billing and insurance policy work, an ordered reference file may be maintained. The new ordered information is merged with the information contained in the reference file. Also certain units of information in the reference file are extracted from time to time. For example, a statistical study may require all units having a common characteristic to be extracted. Also certain units may be extracted from the reference file for processing in conjunction with the newly received information. The reference file is extensive and therefore it is desirable to perform the merge and extraction operations simultaneously.

An information handling system for performing sorting, merging, and extracting operations on data encoded on one or more input tapes is described in an application Serial No. 440,646, filed by Joel N. Smith and William R. Ayres on July 1, 1954, entitled "Information Handling System." This system provides two input tapes and one or more output tapes. A unit of information, termed a message, includes special control symbols, identifying characters, and information characters. The information is processed in accordance with selected criteria each of which may include any desired number of identifying characters up to an arbitrarily fixed maximum number. The selected identifying characters of a message from the respective input tapes are then read into one of two static, serial memories. When the number of selected, identifying characters in a message is less than the maximum number, artificial signals are generated by additional apparatus for advancing the first selected characters of each message to the output stage of each memory.

It is an object of the present invention to provide an improved memory system useful for processing information wherein the number of identifying characters in the criteria is variable.

Another object of the present invention is to provide an improved high-speed memory system for an information handling machine.

A further object of the present invention is to provide an improved memory system useful in handling information stored in a plurality of slow access, serial memories.

According to the invention only two memories are required for performing merging and extracting operations, either separately or simultaneously, as well as sorting operations. By providing circulating loops connecting the outputs and the inputs of the memories, desired ones of the stored criteria can be retained. Two circulating loops are provided for the first memory and one circulating loop is provided for the second memory. Newly entered criteria are supplied to the memory system through three entry means. One of the entry means and one or more of the circulating loops may be activated at any one time. When the newly entered criteria is to be stored, only one circulating loop is activated. When the newly entered criteria is not to be stored, one circulating loop for the first memory and the circulating loop for the second memory are activated. Three different storage registers are provided from which the criteria are supplied character-by-character to a comparison device which is external to the memory system. Two of the entry means are connected to a first storage register which is part of one circulating loop of the first memory. The second storage register is a part of the other circulating loop of the first memory. The third entry means is connected to a third storage register which is part of the circulating loop of the second memory. The output of the second memory is also coupled to the second storage register.

A first and a second group of enabling levels are provided for the memory system. The first group of enabling levels is responsive to the starting of an input tape to control the activation of the entry means, and the activation of the third circulating loop. The second group of enabling levels is responsive to the operation being carried out by the machine. The first and the second group of enabling levels jointly control the activation of the two circulating loops of the first memory.

The criteria read into the memory system can have variable numbers of identifying characters when random access memories are employed. Corresponding characters of the two stored criteria are placed in corresponding addresses of the two memories. Each character of a newly entered criterion produces a series of timing pulses. Certain ones of the timing pulses cause the read out of a character from one address in the two memories to a selected two of the storage registers. A character of the newly entered criterion is read to the third storage register. Others of the timing pulses then gate the characters from a selected two of the registers to the same one address of the two memories. The latter two selected storage registers may be different from the previous two selected storage registers. The operation continues for each character of the newly entered criterion.

Figure 2:
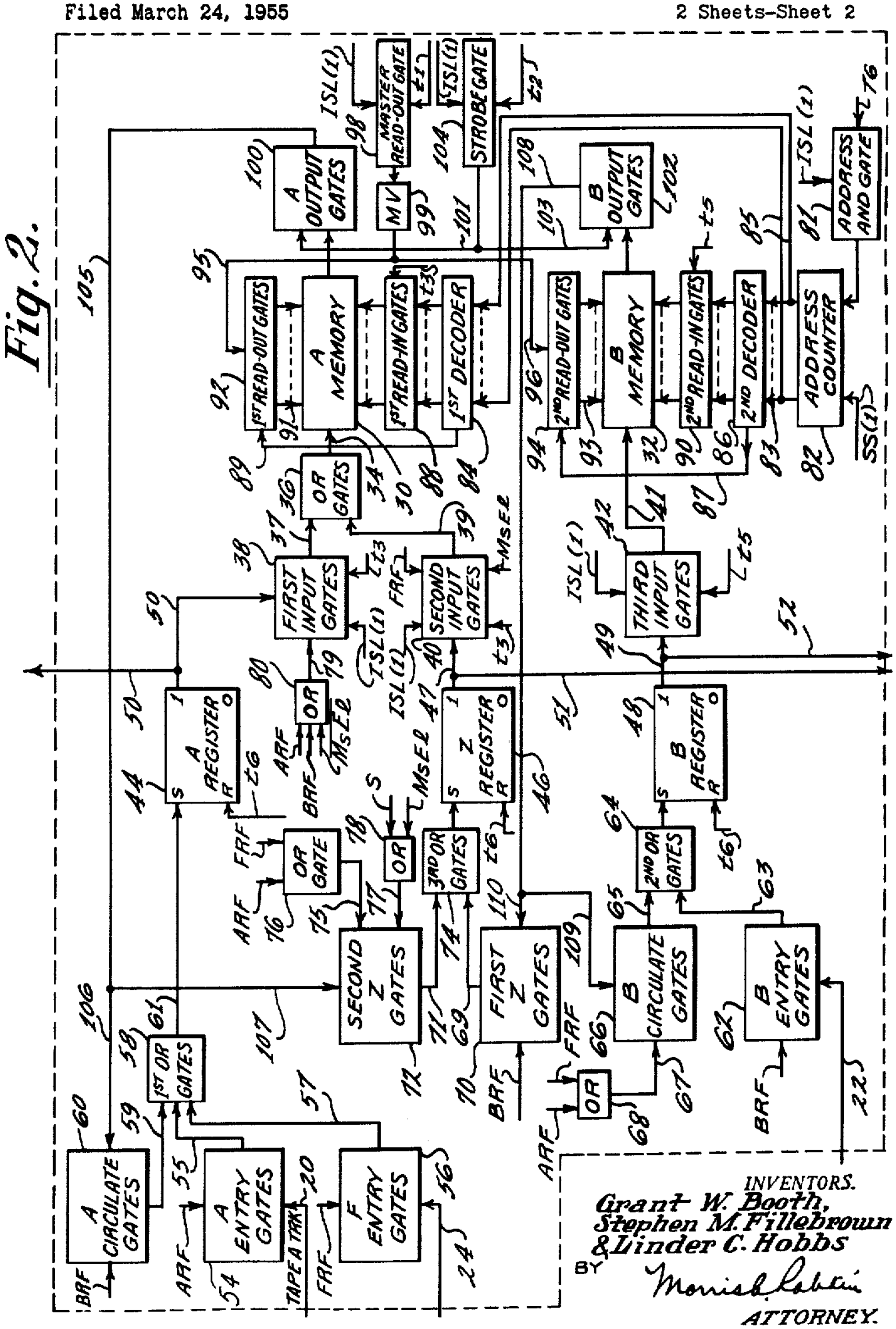

The novel features of this invention as well as the invention itself will be best understood by referring to the following detailed description when read in connection with the accompanying drawing in which:

Fig. 1 is a generalized diagram of an information handling system useful in explaining the operation of the memory system of the present invention, and Fig. 2 is a schematic diagram of a memory system according to the invention.

A generalized block diagram of an environment in which the present invention may be practiced is shown in Fig. 1. In Fig. 1, the information handling system 10 is provided with a large capacity, slow access, storage medium such as magnetic tapes or perforated tapes. Magnetic tapes are preferred because of the increased storage capacity and increased operating speed. The magnetic tapes may be located in an input tape station 12 and may include three different input tapes respectively designated as tape A, tape B, and tape F. Each of the input tapes may be provided with a first or alpha reading head and a second or a beta reading head as more fully described in the aforementioned application, Serial No. 440,646. The alpha head is in a position to read characters in advance of the B head. A tape transport mechanism is provided for moving the tapes beneath these heads. The information is stored on the input tapes in the form of messages. Each message has certain special characters, a variable number of information characters, and is preceded by a plurality of identifying characters. Each character of a message has seven binary digits (bits). The identifying and information characters may correspond to alphabetic or numeric symbols. The special characters are used in the system for deriving signals for controlling the starting and stopping of the tapes and for controlling the selection of certain ones of the identifying characters. The special characters and identifying characters are read by the alpha heads of the respective tapes A, B, and F, and are respectively furnished to the input of a fast access memory system 18 via a tape A trunk line 20, a tape B trunk line 22, and a tape F trunk line 24. The trunk lines 20, 22 and 24 and each of the trunk lines referred to hereinafter contains seven individual leads, one for each bit of a character.

A complete message unit is detected, character-by-character, by the beta head of a running input tape and is transferred to an output tape station 26 by means of an information transfer unit 28. The output tape station 26 is provided with one or more output tapes upon which the transferred information is recorded. Each output tape has a recording head and is driven beneath the recording head by a tape transport mechanism. Start-stop signals for the input and the output tape transport mechanisms are furnished by the logic control unit 14. The high speed memory 18 furnishes the special characters and the identifying characters read by the alpha reading head of a started input tape to the logic control unit 14 in accordance with control signals. These control signals are derived from the special characters which are detected by code recognition gates which are a part of the logic control unit 14. Each character detected by an alpha reading head is furnished to a data selection device 29 described more fully hereinafter which is a part of the logic control unit 14. The present invention is concerned with the memory system 18 which is shown in detail in Fig. 2.

In the memory system 18 of Fig. 2, there are provided two different, random access memories 30 and 32 designated, respectively, as the A memory 30 and the B memory 32. Both the A and B memories 30 and 32 are similar and each may comprise a matrix of magnetic cores arranged in seven rows and thirty-two columns. Each character of seven bits is stored in a column of cores. The thirty-two columns provide storage for thirty-two identifying characters which, for the purpose of the present description, may be the maximum number in any sorting criterion. Any one sorting criterion, however, may contain less than thirty-two characters. Each row of cores is linked by one of seven different row coils. Each row of cores is linked by one of thirty-two different read-in coils and by one of thirty-two different read-out coils. The memories A and B may be connected in a manner similar to the known diode-core type by providing a separate diode in each column coil, and thirty-two diodes for each row coil, one diode for each row winding. An arrangement of a core-diode memory in a 2 x 2 array is shown in an article entitled "A Static Magnetic Memory System for the ENIAC," by Isaac L. Auerback, published at pp. 213–222 of "Proceedings of the Association for Computing Machinery" by Richard Rimbach Associates, Pittsburgh, Pa., 1952. However, it will be apparent to those skilled in the art how the system described in this article can be extended to the 7 x 32 arrays employed in the present invention.

The seven row coils of the A memory are connected via respective ones of a seven lead trunk line 34 to respective ones of seven outputs of a set of "or" gates 36. The "or" gates 36 are seven different two-input "or" gate circuits. Suitable "or" gate circuits are known in the art, as for example, an arrangement of diodes connected to a common output line. The various diodes are biased to provide an output signal when and only when one or more input signals are present on the inputs. One input terminal of each two-input "or" gate of the "or" gates 36 is connected to an individual one of the outputs of a first set of input gates 38 by means of the trunk line 37. The first set of input gates 38 is a composite of seven four-input "and" gate circuits. Suitable "and" gate circuits are also well known, for example, an arrangement of diodes connected to a common output and biased to provide an output signal when and only when an input signal is present on all inputs. The other input terminal of each two input "or" gate of the gates 36 is connected to an individual one of the outputs of a second set of input gates 40 by means of the trunk line 39. The second set of input gates 40 is a composite of seven five-input "and" gate circuits.

The seven row coils of the B memory 32 are connected via a trunk line 41 to respective ones of seven outputs of a third set of input gates 42. The third input gates 42 are a composite of seven three-input "and" gate circuits.

Three different buffer storage units 44, 46 and 48 designated respectively as the A register 44, the Z register 46, and the B register 48 are provided. Each buffer storage unit may include a flip-flop register having seven different flip-flops, one for each bit of a character. Each flip-flop has a set and a reset input, and a zero and a one output. For convenience of drawing, the seven individual set and reset inputs are represented by the single reference letters "S" and "R," respectively. Likewise, the seven individual "zero" and one outputs are represented by the single reference numerals "1" and "0," respectively. Each time a signal is applied to the set input of a flip-flop, the "1" output side has a relatively high voltage level with reference to the "0" output side, and vice-versa when a signal is applied to the reset input.

Each of the seven different "1" outputs of the A register 44 is connected via one of the leads of a trunk line 45 to a corresponding one of the inputs of each "and" gate circuit of the first input gates 38. Two of the remaining inputs of each "and" gate circuit of the first input gates 38 are primed by control signals later described. Each fourth input is activated by a timing signal *t3*. Each of the seven different "1" outputs of the Z register 46 is connected via one of the leads of a trunk line 47 to a corresponding one of the inputs of each "and" gate circuit of the second input gates 40. Three of the remaining inputs of each "and" gate circuit of the second input gate 40 are primed by control signals, and each fourth input is activated by the timing signal *t3*. Each of the seven different "1" outputs of the B register 48 is connected via one of the leads of a trunk line 49 to a corresponding one of the inputs of each "and" gate circuit of the third input gates 42. A second input of each "and" gate circuit of the third input gates 42 is primed by a control signal, and each third input is activated by the timing signal *t5*.

The operation of the information handling system of the present invention may be asynchronous, that is, no external source of timing pulses need be provided. For example, timing signals may be generated internally by applying the signals induced in an alpha reading head to an "or" circuit. The output signal from this "or" circuit is applied to the input of a pulse generating circuit, for example, a Schmitt trigger. The output of the Schmitt trigger is applied to the input of the first of six series-connected delay lines, which delay an input pulse for successive predetermined time intervals. Thus, seven different timing pulses *t1*–*t7* are provided. Timing pulse *t1* is the undelayed output signal from the Schmitt trigger, and timing pulse *t7* is the output signal from the sixth delay line. The remaining five timing pulses *t2*–*t6* are the respective outputs of the first five delay lines. Other known means for generating timing signals, such as a timing track of a rotating magnetic drum, may be employed.

A data selection device 29 is provided as a part of the logic control unit 14 (Fig. 1). This device may be similar to that described in an application Serial No. 431,627, entitled "Data Selection Device," filed May 24, 1954 by Louis A. Fernandez Rivas. Briefly, a data selection device operates to select a given sequence of identifying characters contained in a message. A control signal in the form of a voltage level and designated herein as an enabling level ISL(1) is furnished by the data selection device when certain ones of the identifying characters are to be selected from within a message. The input signal ISL(1) is terminated when the desired number of characters have been selected. The ISL(1) level corresponds to the "select data signal" of the above-mentioned application Serial No. 431,627. For the purpose of the present invention it can be assumed that the first criterion of each message is selected. Thus the ISL(1) level is present when the first criterion of a message is passing beneath the alpha reading head of a running input tape.

The seven different "1" outputs of the A, Z and B registers 44, 46 and 48 (Fig. 2) are also connected via the respective trunk lines 50, 51 and 52 to a multiple message comparator unit 31 which is a part of the logic control unit 14 (Fig. 1). This comparator unit operates to determine the relative order between three different messages in accordance with three different comparisons. One comparison is made between the selected identifying characters from the A register 44 and the selected identifying characters from the B register 48. A second comparison is made between the selected identifying characters from the A register 44 and the selected identifying characters from the Z register 46. The third comparison is made between the selected identifying characters from the Z register 46 and the selected identifying characters from the B register 48. A suitable comparator system is described, for example, in an application, Serial No. 438,372, now Patent No. 2,865,567, entitled "Multiple Message Comparator, filed by Grant W. Booth et al., on June 22, 1954.

The logic control unit 14 responds to the output signals of the comparator to transfer one message from an input tape to an output tape by furnishing a start signal to the tape transport mechanism of one input tape and the tape transport mechanism of one or more output tapes. The start signal for each different input tape is staticized in one of three different flip-flops (not shown) each of which is associated with a respective one of the input tapes. When one of these flip-flops is set it furnishes a relatively high voltage level on its "1" output. The "1" outputs of the flip-flops associated with a stopped input tape is at a relatively low level. The "1" output signals furnished by these three flip-flops comprise a first group of enabling levels designated herein ARF (tape A running forward), BRF (tape B running forward), and FRF (tape F running forward).

A control panel (not shown) having a plurality of control flip-flops is also provided in the logic control unit 14. A different control flip-flop is provided for each operation. Each time an operation is selected, an input signal is applied to the set input of a corresponding control flip-flop. The "1" output signals furnished by these control flip-flops comprise a second group of enabling levels. For the purposes of this explanation of the present invention, only the enabling levels $M_sE_l$ and S corresponding to the operation of simultaneously merging and extracting information and the operation of sorting information, respectively, are described. The remaining operations of merging and extracting are designated herein by one enabling level $\overline{M_sE_l}$. The enabling level $\overline{M_sE_l}$ can be obtained, for example, by connecting the "1" outputs of the remaining control flip-flops to an "or" gate whose output is then the enabling level $\overline{M_sE_l}$. The first and second groups of enabling levels are supplied to the memory system 18.

Referring again to Fig. 2, each lead of the tape A trunk line 20 is connected to a respective one of the inputs of a set of A entry gates 54. The A entry gates 54 are seven, two-input "and" gate circuits, and each second input thereof is primed by the ARF enabling level. Each lead of the tape F trunk line 24 is connected to a respective one of the inputs of a set of F entry gates 56. The F entry gates 56 are seven two-input "and" gate circuits, and each second input thereof is primed by the enabling level FRF.

The seven outputs of the A entry gates 54 are connected via the leads of a trunk line 55 to a first set of "or" gates 58. The "or" gates 58 are seven three-input "or" gate circuits. The respective leads of the trunk line 55 are connected to a first input of each "or" gate circuit. A second input of each "or" gate circuit is connected via the respective leads of a trunk line 57 to the corresponding outputs of the F entry gates 56. The third input of each "or" gate circuit is connected via the respective leads of a trunk line 59 to the corresponding outputs of a set of A circulate gates 60. The A circulate gates 60 are seven two-input "and" gate circuits. One input of each "and" gate circuit of the gates 60 has the enabling level BRF applied thereto. Each of the seven outputs of the first "or" gates 58 is applied via the leads of a trunk line 61 to the respective set of inputs of the A register 44.

Each lead of the tape B trunk line 22 is connected to one of the inputs of a set of B entry "and" gates 62. The B entry gates are seven two-input "and" gate circuits, and each second input thereof is primed by the enabling level BRF. The seven outputs of the B entry gates 62 are connected, via the leads of a trunk line 63, to the inputs of a second set of "or" gates 64. The second "or" gates 64 are seven two-input "or" gate circuits. The second input of each "or" gate circuit is connected, via the trunk line 65, to the corresponding outputs of a set of B circulate gates 66. The B circulate gates 66 are seven two-input "and" gate circuits. One input of each "and" gate circuit is primed by either one of the enabling levels ARF or FRF. Each of these enabling levels is applied to an input of a two-input "or" gate 68. The output of the "or" gates 68 is applied, via the conductor 67, to one input of each "and" gate of the B circulate gates 66. The respective outputs of the second "or" gate unit 64 are applied to a corresponding one of the set inputs of the B register 48.

First and second sets of Z gates 70 and 72 are provided. The first set of Z gates 70 has seven two-input "and" gate circuits, and the second set of Z gates 72 has seven different, three-input "and"' gate circuits. The second input of each "and" gate circuit of the first gates 70 is primed by the enabling level BRF. The seven outputs of the first Z gates 70 are connected via the leads of a trunk line 69 to a third set of "or" gates 74. The third "or" gates 74 are seven, different, "or" gate circuits each having one input connected to the first Z gates 70. The other inputs of the third "or" gates 74 are connected, via the leads of a trunk line 71, to the corresponding outputs of the second Z circulate gates 72. A second input of each "and" gate circuit of the second Z gates 72 is primed by either one of the ARF and FRF enabling levels which are passed through one of the inputs of a two-input "or" gate 76 to a conductor 75 which is connected to each second input. The third input of each "and" gate circuit of the second gates 72 is primed (that is, enabled) by either one of the control signals $M_sE_l$ or S which are passed through one of the inputs of a two-input "or" gate 78 to a conductor 77 which is connected to each third input.

A second input of each "and" gate circuit of the first input gates 38 is connected to a conductor 79 and is primed by one of the enabling levels ARF, BRF and $\overline{M_sE_1}$ which are applied respectively through the inputs of a three-input "or" gate 80 to the conductor 79. The third input of each "and" gate circuit of the first input gates 38 is primed by the enabling level ISL(1). The fourth input of each "and" gate circuit of the first input gates 38 is activated by the timing pulse *t*3.

The second, the third, and the fourth inputs of each "and" gate circuit of the second input gates 40 are primed by a respective one of the enabling levels FRF, $M_sE_1$ and ISL(1) respectively. The fifth input of each "and" gate circuit of the second input gates 40 is activated by the timing pulse *t*3.

The second input of each "and" gate circuit of the third input gates 42 is primed by the enabling level ISL(1), and the third input of each of these "and" gate circuits is activated by the timing pulse *t*5.

An address counter 82 is provided. This counter may be comprised of a five-stage binary counter. Binary flip-flop counters are known in the art, and five stages are sufficient for producing thirty-two different combinations of output signals, one for each count. The "1" and "0" outputs of each flip-flop are connected, via the ten conductors 83, to a first decoder 84 and, via the thirty-two conductors 85, to a second decoder 86. Both the decoder 84 and the decoder 86 may be a diode matrix arranged to furnish an output signal on a different selected one of thirty-two output leads in accordance with the various combinations of voltage levels furnished by the address counter 82. Diode matrices of the general type have been described, for example, in an article, entitled "Rectifier Networks for Multiple Switching," by D. R. Brown and N. Rochester at page 139 of volume 37 of the Proceedings of the I.R.E. (February, 1949).

Each of the thirty-two output leads of the first decoder 84 are used to prime a different one of thirty-two, two-input driver tubes of a set of first read-in gates 88. The output of respective ones of the driver tubes of the first read-in gates 88 is connected to one of the thirty-two column coils of the A memory 30. The second decorder 86 is similarly connected to the thirty-two, two-input driver tubes of a set of second read-in gates 90. The output of respective ones of the driver tubes of the second read-in gates 90 is connected to one of the thirty-two column coils of the B memory 32. Thus, one column of cores of the A memory 30 and a corersponding column of cores of the B memory 32 are selected in accordance with each different combination of signals furnished by the address counter 82.

Each of the thirty-two output leads of the first decoder 84 is connected to a different one of the control grids of individual ones of the first read-out gates 92 by means of a thirty-two lead bus 87. Each of the thirty-two output leads of the second decoder 86 is connected to one of the control grids of individual ones of the second read-out gates 94 by means of another thirty-two lead bus 89. Each read-out coil of the A memory 30 is connected to a different one of the thirty-two output leads 91 of the first read-out gates 92. Each read-out coil of the B memory 32 is connected to a different one of thirty-two output leads 93 of the second read-out gates 94. The read-out gates 92 and 94 each may include thirty-two different driver gates. Each driver gate may include a vacuum tube having two control grids. The other control grid of each driver tube of the read-out gates 92 and 94 is connected via the conductors 95 and 96 respectively, to the output of a one-shot multivibrator 99 which is activated by the output of a two-input, master read-out "and" gate circuit 98. One input of the read-out gate 98 is primed by the enabling level ISL(1), and the other input is activated by the timing pulse *t*1.

Each of the seven output coils of the A memory 30 is connected to a different input of a set of A output gates 100. Each of the seven output coils of the B memory 32 is connected to a different input of a set of B output gates 102. Both the A and B output gates may include seven different, two-input "and" gate circuits. One input of each circuit is primed by the relatively high voltage induced across an output coil when a memory core is driven from one direction of saturation to the other. The second input of each "and" gate circuit of the A and B output gates is activated by the output of a strobe gate 104 via the conductors 101 and 103, respectively.

The strobe gate 104 may be a two-input "and" gate circuit having one input primed by the enabling level ISL(1), and the second input activated by the timing pulse *t*2.

The seven outputs of the A output gates 100 are connected via the leads of a pair of trunk lines 105 and 106 to the corresponding inputs of the A circulate gates 60. The outputs of the A output gates 100 are also connected via the leads of another pair of trunk lines 105 and 107 to the corresponding inputs of the second Z gates 72.

The seven outputs of the B output gates 102 are connected via the leads of a pair of trunk lines 108 and 109 to the corresponding inputs of the B circulate gates 66. The outputs of the B output gates 102 are also connected via the leads of another pair of trunk lines 108 and 110 to the corresponding inputs of the first Z gates 70.

Each of the flip-flops of the A, Z and B registers 44, 46 and 48 is reset by the timing pulse *t*6. Each flip-flop of the address counter is reset by a signal designated herein as SS(1) (start selection signal) from the logic control unit 14 of Fig. 1. This signal SS(1) may be generated as described hereinafter.

*Operation*

For the purpose of explaining the operation of the memory system, let us assume that the information to be handled is received by a business organization which transacts a large volume of business. A reference file of customers and information pertaining to each customer is maintained. Continuous transactions are carried out between the organization and different ones of its customers. These transactions are processed and incorporated into the reference file. One of the first processing operations is that of sorting the transactions into a logical sequence, for example, alphabetic in accordance with customer surname. The sorted transactions are then merged into the reference file. For billing purposes, certain information in the reference file is to be extracted and processed together with the new transactions. Because the reference file is extensive, more efficient operation is achieved if the merging and extracting operations are carried out simultaneously.

*Sorting operation*

In the sorting operation, the new transactions may be encoded as messages on input tapes A and B with the identifying characters to be selected being representative of the customer surnames. Tape F may be the reference file into which the new transactions are merged. The logic control unit 14 then starts input tape A. When input tape A is started, the enabling level ARF is high, thereby priming the A entry gates 54. The seven digits of the first character detected by the alpha reading head of input tape A are passed over the individual leads of the trunk line 20 to the inputs of the A entry gates 54. The primed A entry gates 54, then furnish seven output signals over the leads of the trunk line 55 to the inputs of the first "or" gates 58. The first "or" gates 58 pass the input signals to the respective set inputs of the A register 44. The "1" outputs of the various flip-flops of the A register 44 are applied to one input of each "and" gate circuit of the first input gates 38. The enabling level ARF is also passed through the "or" gate 80 to a second input of each "and" gate of the first input gates 38.

Each character read by the alpha reading head of input tape A is applied to the input of the data selection device 29 (Fig. 1) of the logic control unit 14. Because it is desired to sort the messages in accordance with customer surnames, the data selection device maintains the ISL(1) enabling level at a relatively low voltage level during the presence of certain other identifying characters such as the street address of a customer. However, when the first character of a customer's surname is detected, the data selection device furnishes the ISL(1) enabling level. The presence of the enabling level ISL(1) primes the first input gates 38 of Fig. 2 and the master read-out gates 98.

As each character is read by the alpha reading head, a series of timing pulses is generated in the logic control unit as described previously. The first timing pulse *t1* is applied to the master read-out "and" gate 98. Assume, for the moment, that the ISL(1) enabling level is absent, then the timing pulse *t1* is blocked by the unprimed master read-out gate 98. The timing pulse *t3* is applied to one input of each "and" gate of the first input gates 38. The pulse *t3* is also blocked because of the absence of the enabling level ISL(1). The timing pulse *t6* is applied to each reset input of the A register 44 thereby resetting each flip-flop and bringing each "1" output to a relatively low voltage level.

The second and subsequent characters read by the alpha reading head of the input tape A are similarly passed through the primed, A entry gates 54 to the buffer storage unit comprising the A register 44. The "1" outputs of the A register are applied to the first input gates 38 and to the multiple message comparator 31 (Fig. 1) of the logic control unit 14 as each character is read into the A register 44. The data selection device 29 of the logic control unit 14 does not furnish the ISL(1) enabling level until the first identifying character of the customer's surname is received.

The group of identifying characters constituting each surname is preceded by a control symbol which is a special character comprising a unique permutation of binary digits. The presence of this special character is detected by means of a code recognition circuit which may be a part of the data selection device. A suitable code recognition circuit, for example, is described in Patent No. 2,648,829 entitled "Code Recognition System" issued to W. R. Ayres et al., August 11, 1953. When the control symbol preceding a customer surname is detected, the ISL(1) enabling level is furnished by the data selection device 29 of Fig. 1. The enabling level ISL(1) then primes the master read-out gates 98, the strobe gate 104 and one input of each "and" gate of the first input gates 38.

Prior to each operation, the address counter 82 is reset to a zero count condition by applying an SS(1) signal to each rest input. The SS(1) signal may be generated, for example, by applying the ISL(1) enabling level to a one shot multivibrator (not shown) and connecting the SS(1) lead of the counter 82 (Fig. 2) to the output of this multivibrator. Thus, when the enabling level ISL(1) first appears the reset signal SS(1) is generated.

The combination of voltage levels representing a zero count is applied over the ten leads 85 to the inputs of the first decoder 84. The first decoder 84 responds to this combination of voltage levels by priming that one driver tube of the first read-in gates 88 and the first read-out gates 92 which are respectively associated with the first column of cores of the high-speed A memory 30.

Like any other character, the control symbol generates the series of timing pulses. Also, each control symbol detected by the alpha reading head of the input tape A is passed by the A circulate gates 54 and the "or" gates 58 to the A register 44. The first timing pulse *t1* is passed by the now primed master read-out "and" gate 98 to the input of the one shot multivibrator 99. The output pulse of the multivibrator 99 is applied to the control grids of each driver tube of the first read-out gates 92. The one primed driver tube of the first read-out gates 92 conducts and a current is applied to each core of the first column of the A memory 30. This current generates sufficient magnetizing force to drive each memory core of the first column from a first direction of magnetization to a second direction of magnetization. For the present, assume that there is no information stored in the A memory 30 with each memory core being magnetized in the second direction. Therefore, the magnetizing force generated by the read-out current produces relatively little change of flux in any of the memory cores. Consequently, very little voltage is induced in the seven output coils and each of the "and" gates of the A output gates 100 is unprimed by the A memory output.

The timing pulse *t2* is passed through the primed strobe "and" gate 104 to each second input of the A output gates 100. However, none of these "and" gates pass this input pulse because of absence of an output voltage on output coils of the A memory 30. The period of the one-shot multivibrator 99 is sufficiently along to maintain a read-out driver tube conducting until the timing pulse *t2* is terminated.

The timing pulse *t3* is applied to each of the first input gates 38 and to each of the first read-in gates 88. The other inputs of each "and" gate circuit of the first input gates 38 are primed by the enabling levels ARF and ISL(1). The fourth input of the various first input gates 38 is or is not primed by the voltage level furnished by the A register 44 in accordance with whether or not a binary one appeared in the corresponding binary position of the stored character. An output pulse is furnished in response to the timing signal *t3* by those "and" gate circuits which have enabling levels present on the other three inputs. No output pulse is furnished by those "and" gate circuits which have enabling levels on only two inputs. The respective output pulses, representing the binary ones of the character stored in the A register 44 are passed through the "or" gates 36 to the respective row coils of the A memory 30.

The one primed driver tube associated with the first column of memory cores is rendered conducting by the timing pulse *t3*. The coincidence of the output pulse from this driver tube with a pulse on a row coil of the A memory 30 is sufficient to drive a memory core from the second direction to the first direction of magnetization, thereby storing a binary one in the driven memory core. Thus, the memory cores in a first column of the A memory 30 linked by a row coil on which a pulse is present are driven to the first direction of magnetization. The memory cores in a first column of the A memory 30 linked by a row coil on which no pulse is present remain magnetized in the second direction. Therefore, the character stored in the A register 44 is clocked into the first column of the high-speed A memory 30 by the timing pulse *t3*.

The A register 44 is then cleared by the timing pulse *t6*.

The timing pulse *t6* is also passed through the address "and" gate 81 which is primed by the enabling level ISL(1). The output signal of the address "and" gate 81 advances the address counter 82 one count. The new combination of voltage levels furnished by the address counter 82 is decoded by the first decoder 84. The relatively high-voltage level on one of the outputs of the decoder 84 primes the one driver tube of the first read-in gate 88 which is associated with the second column of memory cores of the A memory 30.

The subsequent identifying characters of the customer surname are stored in successive columns of memory cores of the A memory 30 in a manner similar to that described above for the first column. Each timing pulse *t6* advances the address counter 82 one count thereby priming the driver tubes associated with the next succeeding column of memory cores.

After all the selected identifying characters of the first message encoded on input tape A have been read into the A memory 30, input tape A is stopped and input tape B is started. The start-stop signals may be applied to the respective tape transport mechanisms by the logic control unit 14.

When the input tape A is stopped, the enabling level ARF is removed. When the input tape B is started, the enabling level BRF is present and primes various ones of the gates as described above. Each character read by the alpha reading head of the input tape B is read-into the data selection device 29 of the logic control unit 14 (Fig. 1), and, via the individual leads of the trunk line 22, to the B entry gates 62 of Fig. 2. The primed B entry gates 62 respond to these input signals and furnish corresponding output signals which are passed through the second "or" gates 64 to the corresponding set inputs of the B register 48. The "1" output levels of the B register 48 are applied to corresponding ones of the third input gates 42, and to the comparator unit of the logic control unit 14 of Fig. 1.

As each character is detected by the alpha reading head of the input tape B, the timing signals are generated as described in connection with the characters read from the input tape A. Each timing signal *t6* is applied to each reset input of the A and the B registers 44 and 48 clearing both these registers.

Because the enabling level ISL(1) is low until the control symbol preceding a customer surname is detected, each of the remaining timing signals is blocked. When the desired control symbol is detected, the enabling level ISL(1) is furnished by the data selection device 29 of the logic control unit 14. The enabling level ISL(1) primes one input of each of the first input gates 38 and the third input gates 42. This enabling level ISL(1) also primes the master read-out "and" gate 98, the strobe "and" gate 104 and the address "and" gate 81. The primed address "and" gate 81 passes the pulse generated by the control symbol to the reset inputs of the address counter 82, thereby resetting it to a zero count condition.

The first identifying character of the customers surname in the first message encoded on input tape B is passed by the primed B entry gates 62 and the second "or" gates 64 and is stored in the B register 48. The timing signal *t1* is passed by the master readout gate 98 to the input of the one-shot multivibrator 99. The output pulse of the multivibrator renders conducting a selected primed driver tube of the first read-out gates 92 and a selected primed driver tube of the second read-out gates 94. Thus, a current pulse is applied to each memory core in the first column of the A memory 30 and the first column of the B memory 32. At this time, there is no information stored in the B memory 32 and, consequently, there is substantially no voltage induced across its output coils. However, a relatively large flux change is produced in those cores of the first column of the A memory 30 which are storing binary ones. A relatively small flux change in produced in those cores in the first column of the A memory 30 which are storing binary zeroes. A corresponding high voltage is induced across the output coils linked to the cores storing binary ones. This voltage primes a corresponding one of the "and" gates of the A output gates 100. The remaining "and" gates of the A output "and" gates 100 are unprimed.

The succeeding timing pulse *t2* is passed by the strobe "and" gate 104 to an input of the A output gates 100 and the B output gates 102. Those "and" gates of the A output gates 100 which are primed furnish an output pulse which is passed over the respective leads of the trunk lines 105, 106 and the trunk lines 105, 107 to the corresponding set inputs of the A circulate gates 60 and the second Z gates 72.

The enabling level BRF primes each "and" gate circuit of the A circulate gate 60. Therefore, the pulses from the A output gates 100 are passed through the "or" gates 58 to the corresponding set inputs of the A register 44. The "1" outputs of the A register flip-flops receiving a set input signal prime one input of the corresponding "and" gate circuit of the first input gates 38. The signals from the A output gates 100 are blocked at the second Z gates 72 due to the absence of the enabling levels ARF and FRF.

The timing pulse *t3* clocks the first character into the first column of the A memory 30 as described previously. Thus, the information read out of the first column of the A memory 30 is circulated back to the same first column.

The timing pulse *t5* is applied to each "and" gate circuit of the third input gates 42 and to one control grid of each driver tube of the read-in gates 88 causing the one primed driver tube to conduct. Each of the third input gates 42 which is primed by a "1" output of the B register 48 furnishes an output signal to a row coil of the B memory 32. The coincidence of the signals from the conducting driver tube and these primed "and" gate circuits produce sufficient magnetizing force to read a binary one into the memory cores of the first column corresponding to the primed ones of the third input "and" gates 42. The remaining memory cores of the first column are not changed by the conduction of the driver tube. Therefore, the first, selected identifying character read from the B tape is entered into the first column of the B memory 32.

The voltage combinations representative of the first A tape selected character circulated from the A memory 30, and the first B tape selected character entered into the B memory 32 are applied by the A and B registers 44 and 48 to the multiple message comparator 31 via the trunk lines 50 and 52, respectively. Both of the A and B registers 44 and 48 are then cleared by the timing pulse *t6*.

The timing pulse *t6* produced by the first selected character read from the input tape B is passed through the primed address "and" gate 81 to the address counter 82 advancing this counter one count. Thus, the second column of memory cores of the A and B memories 30 and 32 are next interrogated at the subsequent timing pulse *t1* which is produced by the second character read from the input tape B. The signals representing the character stored in the second column of A memory 30 are clocked through the A circulate gates 60 by the timing pulse *t2*, and circulated back to the second column of the A memory 30 by the timing pulse *t3*. The signals representing the second character read from the input tape B are entered into the second column of the B memory 32 by the timing pulse *t5*.

As each next succeeding character is read from the input tape B, a corresponding character is read out of and is circulated back to the like column of the A memory 30. Each of the characters read into the A and B registers 44 and 48 are compared by the multiple message comparator 31 which determines the relative order between the selected identifying characters of the first messages encoded on the input tapes A and B.

If the customer surname associated with the first message encoded on input tape A is less than, that is logically precedes, the customer surname associated with the first message encoded on input tape B, then input tape A is started and input tape B is stopped. If the customer surname associated with the first message encoded on input tape A is greater than, that is logically succeeds, the customer surname associated with the first message encoded on input tape B, then input tape B continues to run. If the two customer surnames are the same, input tape A is arbitrarily started (or continues to run) and input tape B is stopped.

Assume that the customer surname from input tape B is the lesser. The entire first message passes beneath the beta reading head of the input tape B and is gated through the information transfer link 28 of Fig. 1 to a selected one of the output tapes. As the input tape B advances, the characters of the second message begin to pass beneath the alpha reading head and are read into the data selection device 29 of the logical control unit 14 and the register B of the memory system 18. However, the signals representing these characters are not entered into the B memory 32 until the enabling level ISL(1) again appears.

The enabling level ISL(1) is again produced by the data selection device 29 when the first control symbol preceding the customer surname associated with the second message encoded on input tape B is detected. The enabling level ISL(1) then primes the master read-out "and" gate 98, the strobe "and" gate 104, the address "and" gate 81 and each of the first input gates 38 and the third input gates 42.

The signals representing the first character of the customer surname of the second B tape message are passed through the B entry gates 62 to the B register 48. The timing pulses *t*1, *t*2 and *t*3 cause the information stored in the first column of the A memory 30 to be circulated as before. The timing pulses *t*1 and *t*2 gate the information stored in the first column of the B memory 32 to the first Z gates 70 and the B circulate gates 66 via the trunk lines 108, 110 and 108, 109, respectively. However, only the first Z gates 70 are primed by the enabling level BRF and the signals representing the character stored in the first column of the B memory 32 are passed through the third "or" gates 74 to the set inputs of the Z register 46.

The voltage levels representing the characters stored in the A, B and Z registers are applied to the multiple message comparator 31 of the logic control unit 14. The timing pulse *t*5 then clocks the signals representing the selected character from input tape B through the third input gates 42 to the first column of cores of the B memory 32. This new information replaces the previous information which was stored in this first column. The timing pulse *t*6 then advances the address counter 82 by one count and clears the A, B and Z registers 44, 48 and 46.

The operation is similar for each new character of the second customer surname encoded on the input tape B. Thus, the information from the next column of the A memory 30 is circulated, and the information from the next column of the B memory 32 is passed to the first Z gates 70 and is replaced by the information stored in the B register 48.

On the basis of the information supplied to the multiple message comparator 31 (Fig. 1), a decision is made as to whether input tape B should be allowed to run or whether the input tape B should be stopped and the input tape A started. If the sequence can be continued on the output tape by transferring the message encoded on the input tape A, then a start signal is applied to the tape transport mechanism associated with the input tape A and a stop signal is applied to the tape transport mechanism associated with the input tape B. If the input tape B is allowed to run, the operation of the memory system continues in the same manner as that just described.

Assume now that input tape A is started and input tape B is stopped. The enabling level BRF is removed and the enabling level ARF is now present. The entire first message encoded on the input tape A passes beneath the beta reading head and is gated through the information transfer link 28 to one of the output tapes. The characters of the second message begin to pass beneath the alpha reading head and are read into the data selection device 29 and the A register 44 of Fig. 2 of the memory system 18. When the first control symbol preceding the customer surname associated with the second message encoded on input tabe A is detected, the enabling level ISL(1) is produced priming various gates of the memory system 18. The address counter 82 is reset to a zero count condition. Because the enabling level ARF is present, the second Z gates 72 and the B circulate gates 77 are primed. Also the A circulate gates 60 are blocked due to the absence of the enabling level BRF.

The signals representing the first character of the second customer surname are entered into the A register 44. The timing pulses *t*1 and *t*2 cause the information stored in the first column of the A memory 30 to be circulated through the A output gates 100, the second Z gates 72 and the third "or" gates 74 to the Z register 46. The information stored in the first column of the B memory 32 is circulated through the B output gates 102, the B circulate gates 66, and the second "or" gates 64 to the B register 48. The voltage levels representing the characters stored in the A, B and Z registers 44, 48 and 46 are applied to the multiple message comparator 31 of the logic control unit 14 of Fig. 1.

The timing pulse *t*3 gates the character from A register 44 through the "or" gates 36 to the first column of the A memory 30. The timing pulse *t*5 gates the character from the B register 48 into the first column of the B memory 32. The operation is similar for each succeeding character of the customer surname of the second message encoded on the input tape A. Again, the comparator 31 of Fig. 1 determines the relative order of precedence between the selected identifying characters from the input tape A and the characters from the A and B memories 30 and 32 of Fig. 2 and one of the messages is transferred from one or the other of the input tapes to an output tape.

Note that the number of characters representing a customer surname in any one message may be different from the number of characters in the customers surname of another message encoded on the same input tape. For example, assume that the customer surname of the first message on the input tape A is 7 characters long, the customer surname of the second message is only 5 characters long, the customer surname of the third message is 9 characters long. As previously mentioned, each surname is preceded by a control symbol. Each other group of identifying characters, for example a street address, is also preceded by a similar control symbol. The enabling level ISL(1) remains high for a sufficiently long period for the control symbol following the current customer surname and preceding the next group of identifying characters to be gated into the A memory 30. Thus, the first eight columns of the memory A represent the first customer surname and the control symbol immediately succeeding. When the second customer surname is gated into the A memory 30, six columns are sufficient to represent the customer surname and the succeeding control symbol. The information remaining in the seventh and the eighth columns is not read out. However, when the third customer surname is gated into the A memory 30, ten columns are required to represent the customer surname and the following control symbol. Accordingly, when the control symbol in the sixth column is received by the comparator 31, the useless information stored in the seventh and eighth columns is ignored and, therefore, does not affect the operation of the system.

If desired, information may be gated into both the A and B memories simultaneously. In such case, however, a larger power supply is required because two different columns of memory cores of the respective memories are energized at the same time.

When all the messages encoded on the input tapes A and B have been transferred to the output tapes, these output tapes may become new input tapes A and B and the sorting operation is continued until all the messages are stored into the desired logical sequence on one output tape.

*Merging operation*

Assume, now, that it is desired to merge the sorted messages into the reference file in accordance with customer surname. The reference file is encoded on the input tape F. The messages to be merged are encoded on the input tape B. In the merge operation, both the enabling levels $M_sE_1$ and S are absent and the enabling level $\overline{M_sE_1}$ is present.

A start signal is applied to the input tape F tape transport mechanism and signals representing the customer surname of the first message are entered through the F entry gates 56 of Fig. 2 from the trunk line 24. These signals are passed through the first "or" gates 61, the A register 44 and the first input gates 38 to the A memory 30. After the entire first customer surname has passed beneath the alpha head of the tape F, the tape F is stopped and the tape B is started. The signals representing the customer surname of the first message encoded on the input tape B are passed through the B entry gates 62 of Fig. 2, the second "or" gates 64, the B register 48 and the third input gates 42 to the B memory 32. During the time in which the characters are being read from the input tape B, the characters stored in the A memory 30 are circulated through the A circulate gates 60, the first "or" gates 58, the A register 44 and the first input gates 38 back to the A memory as in the sort operation. The second Z gates 72 are blocked due to the absence of both the $M_8E_1$ and the S enabling levels. A comparison is made between the two customers surnames in the multiple message comparator 31 of the logic control unit 14 of Fig. 1. On the basis of this comparison the input tape B is either allowed to continue running, or the input tape B is stopped and the input tape F is started. When the input tape F is started, the signals representing the customer surname of the second message are read into the A memory 30 of Fig. 2 as before, and the circulation of signals representing the first stored customer surname from the A memory 30 is blocked due to the absence of the enabling level BRF.

When the input tape B continues running, signals representing the second customer surname are read into the B memory 32 and the circulation of signals representing the first, stored customer surname is blocked due to the absence of both enabling levels ARF and FRF. The signals representing the first customer surname read from the memory B pass through the first Z gates 70 to the Z register 46. However, because the messages are already ordered on the input tapes F and B, only one comparison need be carried out. Accordingly, the information read out of the Z register 46 may be ignored by the logic control unit 14 of Fig. 1. Only one operation is required to merge the input messages on a single output tape because the input messages are already ordered on the respective input tapes.

*Extracting operation*

The extraction operation is carried out in the memory system 18 in the same manner as the merge operation just described. The reference file from which the information is to be extracted may be encoded on input tape F. The list of extraction information, for example, a series of customer surnames may be encoded in alphabetical order on the input tape B. The $\overline{M_8E_1}$ enabling level primes one input of each of the first input gates 38 of Fig. 2. The signals representing the first customer surname from the list on input tape B are read into the B memory 32 as before. The signals representing the customer surname of the first message encoded on input tape F are read into the A memory 30. This first customer surname of the F tape is compared with the circulated customer surname from the B memory 32.

The extraction of messages may be carried out on an equality basis wherein all those messages on the reference tape F which have a customer surname the same as one encoded on the list tape B are extracted. Also, the extraction can be carried out on an inequality basis wherein those messages on the tape F which have a customer surname different, either greater than or less than in alphabetical order, from a customer surname on the tape B are extracted. In so far as the operation of the memory system 18 is concerned, the basis for extracting messages does not affect its operation. Assume, then that the basis for extracting messages is equality.

The input tape F then continues to advance until an equality is detected between the customer surname circulated from B memory 32 and a customer surname read from the tape F. The message containing the equal customer surname is transferred from the reference tape F to an output tape through the information transfer link 28 (Fig. 1). The next customer surname is read from input tape F to the A memory 30. If this customer surname is larger than the customer surname circulated from the B memory 32, the input tape F is stopped and a new customer surname is read into the B memory 32 from the list encoded on the input tape B. The circulation of the customer surname previously stored in the B memory 32 is prevented due to the absence of the enabling levels ARF and FRF at the "or" gate 68. However, the customer surname stored in the A memory 30 is circulated through the A circulate gates 60 back to the A memory 30. The input tape B continues to advance until the comparator unit 31 of Fig. 1 either detects an equality between the customer surname circulated from the A memory 30 and a customer surname read in from the input tape B, or detects that a customer surname read in from input tape B is larger than the customer surname circulated from the A memory 30. In either case the input tape B is stopped and the next succeeding customer surname is read into the A memory 30. The operation proceeds in this fashion until all the messages encoded on the tape F have been examined or until the list of customer surnames on the tape B is exhausted. Again, as in the merge operation, the information circulated to the Z register 46 from the B memory 32 may be ignored by the comparator unit 31 (Fig. 1) because the information on both the input tapes F and B is already ordered.

*Simultaneous merge-extract operation*

In the simultaneous merge-extract operation, the reference file may be encoded on the reference tape F. The information desired to be merged with the reference file may be encoded on the input tape A, and the list of information determining which messages are to be extracted may be encoded on the input tape B. In this operation, information may be extracted from both the reference tape F and the input tape A and transferred to a first output tape. The information from the input tapes F and A may be transferred to and merged in order on a second output tape. The enabling level $M_8E_1$ primes one input to each of the second input gates 40.

In operation, the tape B is started and the first customer surname from the list is read into the B memory 32. Input tape B is then stopped and input tape A is started. The first customer surname from the input tape A is read into the A memory 30. The list customer surname stored in B memory 32 is circulated through the B circulate gates 66 back to the B memory 32. During the entry of the customer surname from the tape A through the A register 44 and the circulation of the customer surname to the B memory 32 through the B register 48, a first comparison is made in the comparator unit 31 (Fig. 1). The result of this comparison is staticized in a flip-flop (not shown). The input tape A is then stopped and the reference tape F is started. The first customer surname from reference tape F is passed through the A register 44 to the comparator unit 31 (Fig. 1). The first input gates 38 block the customer surname from the A memory 30 due to the absence of the enabling levels ARF, BRF and $\overline{M_8E_1}$. The customer surname stored in the A memory 30 is passed through the second Z gates 72, the Z register 46, and the second input gates 40 back to the A memory 30. The list customer surname stored in the B memory 32 is circulated through the B circulate gates 66, the B register 48, and the third input gates 42 back to the B memory 32.

The customer surname from the tape F is compared with the customer name from the A memory 30 and the customer surname from the B memory 32 in the comparator unit 31 (Fig. 1). On the basis of these two comparisons, and the first staticized comparison, a decision is made for transferring a message from either the tapes A and F to either the first or the second output tape. Thus, if the customer surname from the tape A or F is the same as the customer surname from the list tape B, the message containing the identical customer surname is transferred to the first output tape. If both the customer surnames from the tapes F and A are greater than the customer surname from the list tape B, the message containing the lesser of the two customer surnames on the tapes is transferred to the second output tape. If both customer surnames from the tapes A and F are the same as the customer surname from the tape B, tape A is arbitrarily started and the message containing the customer surname is transferred to both the first and second output tapes. The customer surname of the next succeeding message on the tape A is read into the A memory 30 and the tape A is stopped. The message containing the same customer surname from the tape F is then transferred to both output tapes. In general, the reference tape F continues to run until a customer surname is detected which is (1) equal to or greater than the customer surname stored in the A memory 30 or (2) the same as the customer surname stored in the B memory. In the situation (1), the input tape F is backed up to at least the start of the message containing the customer surname just compared and is then stopped. The input tape A is then started and the message containing the customer surname just compared is transferred to the second output tape. The customer surname of the next message from the input tape A is entered into the A memory 30. The previous comparison between the customer surname from the reference tape F and the list customer surname stored in the B memory 32 is staticized in another flip-flop. One comparison is then made between the new customer surname from the tape A and the customer surname which is circulated from the B memory 32, and another comparison is made between the incoming customer surname from the tape A and the previous customer surname from the tape A. On the basis of these two new comparisons, and the previous comparison which is staticized a decision is made as to whether input tape A should continue running or whether input tape A should be stopped and the input tape F started.

In the situation (2), the input tape F continues running, and the message containing the first customer surname is transferred to the first output tape. The second customer surname from the tape F is passed through the F entry gates 56 and the A register 44 to the comparator unit 31. Three new comparisons are carried out between the customer surnames passed through the A, B and Z registers, and so forth.

If both the customer surnames from the tapes A and F are less than the customer surnames from the list tape B, then the running tape A or F is stopped and the input tape B is started. The previous comparison between the customer surname from the reference tape F and the customer surname from the input tape A is staticized. The next customer surname from the list tape B is then passed through the B register 48 to the B memory 32. The previous customer surname stored in the B memory 32 is passed through the first Z gates 70 and the Z register 46 to the comparator unit 31 (Fig. 1). Two other comparisons are performed. One comparison is made between the customer surname circulated from the A memory 30 (Fig. 2) through the A register 44 and the previously stored customer surname which is read out of the B memory 32 and passed through the Z register 46 to the comparator unit 31 (Fig. 1). The other comparison is made between the customer surname read out of the B memory 32 through the register Z and the next customer surname read into the B memory 32 through the B register 48. The list tape B continues to run until the comparator unit 31 (Fig. 1) signals either that an equality exists between a customer surname read from the list tape B and a customer surname circulated from the A memory 30 (Fig. 2), or that a customer surname read from the list tape B is greater than the customer surnames from both the input tape A and the reference tape F. In either of these situations, the input tape B is stopped and one of the input tapes A or F is started.

By continuing reading in new information to the memory system 18 from a selected one of the input tapes and transferring a selected message to either the first or second output tapes, the reference file encoded on the input tape is merged with the incoming messages encoded on the input tape A, and selected messages from the input tapes A and F are extracted in accordance with the list encoded on the input tape B.

There has been described herein a simple, flexible memory system for use in an information handling machine. Information from desired ones of two or more slow access, serial memories, such as magnetic tape, can be entered into the system by selectively activating entry means associated with the slow access memories. The provision of a plurality of circulating loops which can be selectively activated permits the merging and extracting operations to be carried out simultaneously.

A saving in equipment and operating time in processing variable word length information is obtained by employing high speed, random access memories in the memory system. The memory system is also adaptable for use in processing so called "fixed word length" information, that is, each message unit contains a fixed number of identifying characters, some of which may be artificial.

What is claimed is:

1. In an information handling system having a plurality of input tapes and adapted to rearrange information encoded on said input tapes onto at least one output tape in accordance with one or more of a plurality of logical operations, the combination of a memory system comprising first and second memory devices, each having an input and an output, a first, a second and a third temporary storage means, a first circulating loop connecting the output and the input of said first memory through said first temporary storage means, a second circulating loop connecting the output and the input of said first memory through said second temporary storage means, a third circulating loop connecting the output and the input of said second memory through said third temporary storage means, first and second signal entry means connected to said first temporary storage means, a third signal entry means connected to said third temporary storage means, a first plurality of inputs for receiving a first plurality of enabling signals each responsive to the starting of a corresponding one of said input tapes, a second plurality of inputs for receiving a second plurality of enabling signals each corresponding to one of said operations, means under the joint control of one of said first and one of said second plurality of enabling signals for activating one of said first and second circulating loops, means under the control of said one of said first plurality of enabling signals for either activating one of said first and second entry means or for activating said third entry means.

2. In an information handling system the combination as recited in claim 1 wherein said first and second memories are random access memories, and including means for reading out a character from a corresponding address of said first and second memories at the same time.

3. In an information handling system the combination as recited in claim 1 wherein said first and second memories are random access memories, and including means for reading out a character from a corresponding one of the addresses of said first and second memories, and returning at least one of said read out characters to the same one address.

4. In an information handling system having a plurality of input tapes and adapted to rearrange information encoded on said input tapes onto at least one output tape in accordance with one or more of a plurality of logical operations, the combination of a memory system comprising first and second memory devices, each having an input and an output, a first, a second and a third temporary storage means, a first circulating loop connecting the output and the input of said first memory through said first temporary storage means, a second circulating loop connecting the output and the input of said first memory through said second temporary storage means, a third circulating loop connecting the output and the input of said second memory through said third temporary storage means, a signal entry means connected to said third temporary storage means, a first plurality of inputs for receiving a first plurality of enabling signals each responsive to the starting of a corresponding one of said input tapes, a second plurality of inputs for receiving a second plurality of enabling signals each corresponding to one of said operation, means under the joint control of one of said first and one of said second plurality of enabling signals for selectively activating one of said first and second circulating loops, and means under the control of one of said first plurality of enabling signals for activating selectively either said third circulating loop or said signal entry means.

5. In an information handling system having a plurality of input tapes and adapted to rearrange information encoded on said input tapes onto at least one output tape in accordance with one or more of a plurality of logical operations, the combination of a memory system comprising a memory device having an input and an output, a first and a second temporary storage means, a first circulating loop connecting the output and the input of said first memory through said first temporary storage means, a second circulating loop connecting the output and the input of said memory through said second temporary storage means, first and second signal entry means connected to said first temporary storage means, a first plurality of inputs for receiving a first plurality of enabling signals each responsive to the starting of a corresponding one of said input tapes, a second plurality of inputs for receiving a second plurality of enabling signals each corresponding to one of said operations, means under the joint control of one of each of said first and second enabling signals for activating one of said first and second circulating loops, and means under the control of one of said first plurality of enabling signals for activating selectively one of said first and second signal entry means.

6. In an information handling system having at least a first, and a second and a third input tape and arranged for merging information encoded on said first and second input tapes into a predetermined sequence onto a first output tape and simultaneously extracting information encoded on said first and second input tapes in accordance with information encoded on said third input tape onto a second output tape, the combination of a memory system comprising first and second memory devices each having an output and an input, first, second and third temporary storage means, first and second circulating loops connecting said output and said input of said first memory device through said first and second temporary storage means, respectively, a third circulating loop connecting said output and said input of said second memory device through said third temporary storage means, first and second signal entry means coupled to said first temporary storage means, third signal entry means coupled to said third temporary storage means, first, second and third inputs for receiving enabling signals each responsive to the starting of a corresponding one of said input tapes, fourth and fifth inputs for receiving enabling signals respectively responsive to the selection and non-selection of said simultaneous operations, respectively, means under the joint control of said third and said fourth enabling signals for activating said second circulating loop, and means under the joint control of one or the other of said first and second enabling signals and said fifth enabling signal for activating said first circulating loop.

7. In an information handling system having a plurality of input tapes and adapted to rearrange information encoded on said input tapes onto at least one output tape in accordance with one or more of a plurality of operations, the combination of a memory system comprising a first and a second memory each having an input and an output, a first, a second and a third temporary storage means, a first circulating loop connecting the output and the input of said first memory through said first temporary storage means, a second circulating loop connecting the output and the input of said first memory through said second temporary storage means, a third circulating loop connecting the output and the input of said second memory through said third temporary storage means, a first plurality of inputs for receiving a first plurality of enabling signals each responsive to the starting of a corresponding one of said plurality of input tapes, a second plurality of inputs for receiving a second plurality of enabling signals each responsive to a corresponding one of said plurality of operations, a selected one of said first and second circulating loops being activated under the joint control of one of said first plurality and one of said second plurality of enabling signals, and said third circulating loop being either activated or deactivated selectively under the control of one of said first plurality of enabling signals.

No references cited.

UNITED STATES PATENT OFFICE

CERTIFICATE OF CORRECTION

November 3, 1959

Patent No. 2,911,624

Grant W. Booth et al.

It is hereby certified that error appears in the printed specification of the above numbered patent requiring correction and that the said Letters Patent should read as corrected below.

Column 13, line 63, for "link" read -- linked --; column 16, line 53, for "in B" read -- in the B --; column 17, line 51, for "Fentry" read -- F entry --.

Signed and sealed this 10th day of May 1960.

(SEAL)
Attest:

KARL H. AXLINE
Attesting Officer

ROBERT C. WATSON
Commissioner of Patents